United States Patent [19]

Salame

[11] 4,309,121
[45] Jan. 5, 1982

[54] SWIVEL CONSTRUCTION

[76] Inventor: Edward J. Salame, c/o Travers Welding Company, Mechanic St., Gardner, Mass. 01440

[21] Appl. No.: 109,827

[22] Filed: Jan. 7, 1980

[51] Int. Cl.³ .......................... F16D 1/12; F16D 3/00
[52] U.S. Cl. .................................................. 403/164
[58] Field of Search ................ 403/161, 162, 163, 164

[56] References Cited

U.S. PATENT DOCUMENTS

| | | | |
|---|---|---|---|
| 1,853,153 | 4/1932 | Skeel | 403/162 |
| 2,987,752 | 6/1961 | Black | 403/164 X |
| 3,010,733 | 11/1961 | Melton et al. | 403/164 X |
| 4,076,346 | 2/1978 | McMahan | 403/164 X |
| 4,085,983 | 4/1978 | Johnson | 403/164 X |
| 4,135,694 | 1/1979 | Stegenga | 403/162 X |

Primary Examiner—Wayne L. Shedd
Attorney, Agent, or Firm—Charles R. Fay

[57] ABSTRACT

A swivel construction for a pair of superposed relatively rotatable plates having a ball bearing race therebetween and comprising a bolt fixed to the top plate and extending through the bottom plate centrally thereof, a cylindrical plastic bearing sleeve between the bolt and the bottom plate, a flange on the sleeve, and a nut on the bolt exerting variable pressure on the sleeve flange and on the bottom plate.

8 Claims, 3 Drawing Figures

SWIVEL CONSTRUCTION

BACKGROUND OF THE INVENTION

There are many swivels for various purposes especially in furniture, bar stools, and supports in general. Many are made so as to preclude disassembly, e.g. for repair, and so must be disposed of in case of failure of the swivel function. Others are complicated and expensive, and still others cannot be adjusted to vary the degree of resistance to the rotary action.

This invention provides a relatively simple swivel construction that is easy to assemble and disassemble, is easily and finely adjusted as to the swivel action, and is not expensive to manufacture.

SUMMARY OF THE INVENTION

A top plate and a bottom plate are swiveled together by a bolt having a head at the upper surface of the top plate and extending through aligned holes in the plates, receiving a nut at its lower end at the lower surface of the bottom plate. A plastic bearing sleeve for the bolt is located in the hole in the bottom plate and has a flange at the lower surface thereof. The nut is easily turned to exert variable pressure on the flange and thus on the bottom plate, the bolt being fixed to the top plate.

PREFERRED EMBODIMENT OF THE INVENTION

Figure 1:
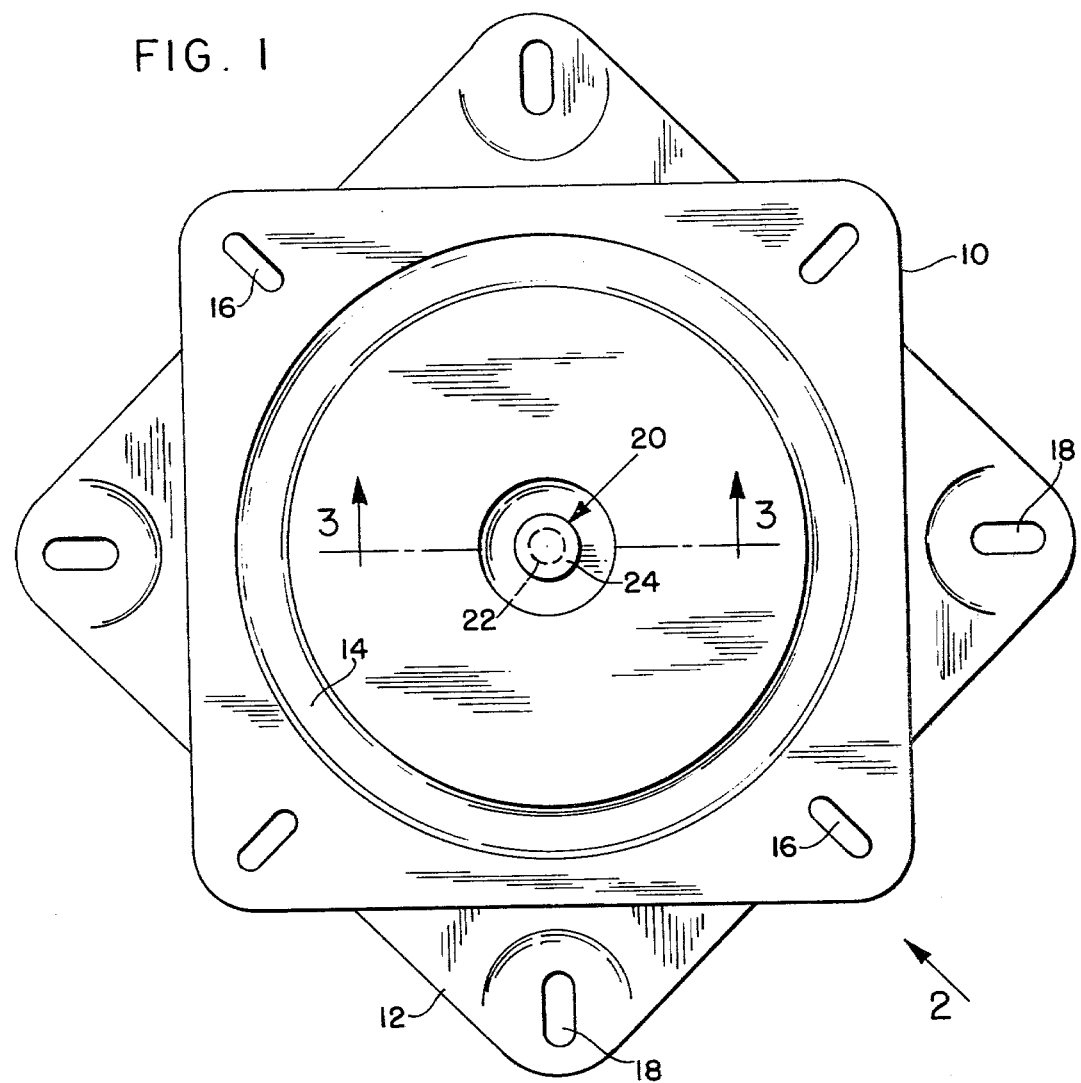
FIG. 1 is a top plan view of a swivel.
Figure 2:
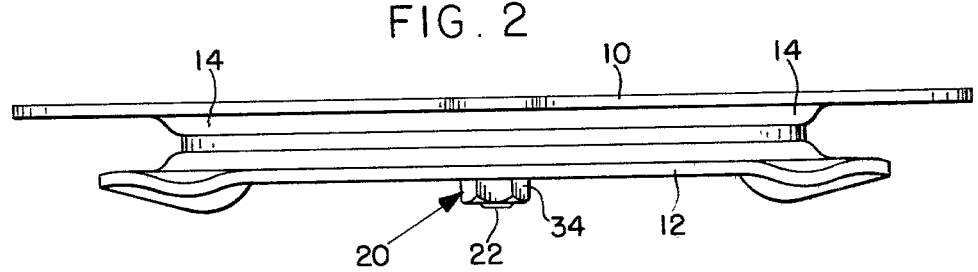
FIG. 2 is an edge view thereof looking in the direction of arrow 2 in FIG. 1.
Figure 3:
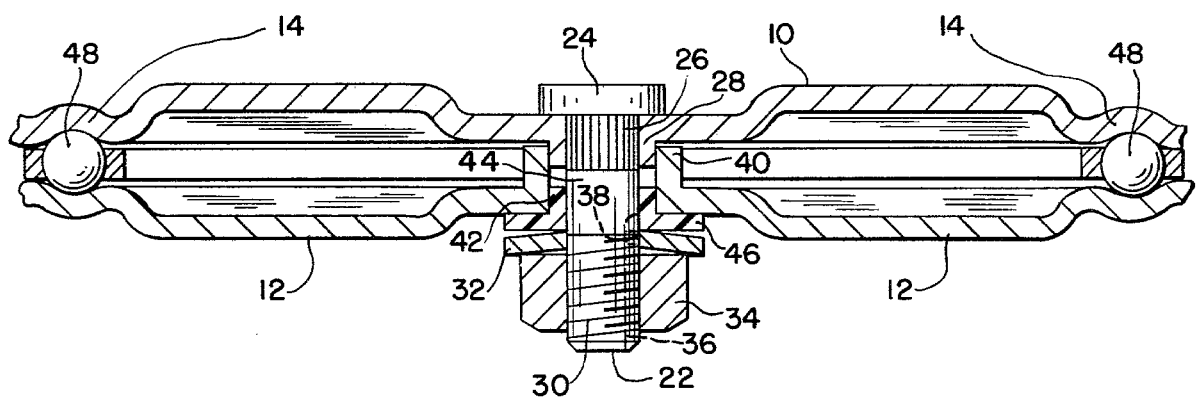
FIG. 3 is an enlarged section on line 3—3 in FIG. 1.

A swivel for purposes akin to swivel seats for furniture, bar stools, supporting stands, etc., and like structures is generally illustrated in FIGS. 1 and 2. A top plate 10 and a bottom plate 12 are preferably provided with a ball bearing race 14 for bearings between plates, slots as at 16, 18 for fastening the bottom plate to a support and the top plate to e.g., a seat or other object that is desired to swivel. A central swivel, here generally indicated at 20 holds the plates assembled.

In the present case, the swivel 20 includes a hardened bolt 22 having a head 24 bearing on the upper surface of top plate 10. Flutes 26 are impressed into the inner surface of cylindrical top plate flange 28 which extends downwardly, fixing the bolt and top plate together. The bolt has a threaded portion 30 extending below the bottom plate for the reception of a dished spring washer 32 and a nut 34. Washer and nut are interengaged as by a longitudinal slot 36 in the surface of the bolt and an inwardly directed tit 38 on the washer located in the slot.

The flange 28 on the top plate 10 defines a central hole axially aligned with a central hole defined by upwardly directed cylindrical flange 40 on the bottom plate 12. Bottom plate flange 40 is larger in diameter than top plate flange 28 and may encompass the same at least in part but does not impinge on it. A bearing sleeve 42 is located in flange 40. This bearing sleeve is preferably a suitable plastic material and fills the void between flange 40 and the surface of bolt 22 which may have a smooth portion 44 in this area.

Sleeve 42 has a flat annular flange 46 bearing on the lower surface of the bottom plate 12 with variable pressure depending on the actuation of the nut 34 and this provides for variation of ease with which the two plates may be relatively rotated. The bearing race 14 contains ball bearings 48 and by turning the nut, the pressure on these bearings is varied.

This construction is relatively simple and is easily assembled and disassembled, providing at the same time a smooth swivel action between the plates.

I claim:

1. A swivel construction comprising a top plate, a bottom plate, a swivel connecting the plates, aligned center holes in the plates,
    the swivel comprising a center bolt, a head on the bolt in contact with the upper surface of the top plate, a threaded end portion on the bolt, the bolt extending through the aligned center holes and the threaded portion of the bolt extending past the bottom plate, means preventing relative rotation of the bolt and the top plate,
    a flanged bearing sleeve on the bolt, the flange thereof underlying the portion of the bottom plate adjacent its center hole, the sleeve extending generally through the bottom plate center hole,
    a nut on the bolt threaded portion providing adjustment of the degree of resistance to relative rotation of the plates by variable pressure on the sleeve flange and bottom plate,
    and interengaging means between the washer and bolt preventing relative rotation of the same.

2. The swivel connection of claim 1 wherein the means preventing rotation of bolt and top plate includes interengaging means between the bolt and the top plate.

3. The swivel connection of claim 1 wherein the interengaging means between the bolt and washer includes a longitudinal slot in the bolt and a projection on the washer engaged in the slot.

4. The swivel connection of claim 1 wherein the washer bears on the flange on the bearing sleeve.

5. The swivel connection of claim 4 wherein the washer and bearing sleeve are both plastic.

6. The swivel connection of claim 1 wherein there is a void between the center bolt and the bottom plate and the bearing sleeve substantially fills this void.

7. The swivel connection of claim 6 wherein the void is annular about the bolt, and a flange on the bottom plate surrounding the bolt and being spaced therefrom to provide the void.

8. The swivel connection of claim 8 including a smooth unthreaded portion on the bolt in the area of the bearing sleeve.

* * * * *